(12) United States Patent
Shearer et al.

(10) Patent No.: US 9,009,583 B2
(45) Date of Patent: Apr. 14, 2015

(54) CREATING CROSS-TABULAR REPORTS

(75) Inventors: Gavin N. Shearer, Seattle, WA (US); Jingxia Xing, Beijing (CN); Fergal P. Condron, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1143 days.

(21) Appl. No.: 12/979,072

(22) Filed: Dec. 27, 2010

(65) Prior Publication Data

US 2012/0166927 A1 Jun. 28, 2012

(51) Int. Cl.
*G06F 17/00* (2006.01)
*G06F 17/24* (2006.01)

(52) U.S. Cl.
CPC .................................... *G06F 17/246* (2013.01)

(58) Field of Classification Search
CPC ....................................... G06F 17/245–17/247
USPC .................................................. 715/212, 227
See application file for complete search history.

(56) References Cited

U.S. PATENT DOCUMENTS

| | | | |
|---|---|---|---|
| 6,626,959 B1* | 9/2003 | Moise et al. ................... | 715/210 |
| 7,143,339 B2 | 11/2006 | Weinberg et al. ............. | 715/503 |
| 7,185,279 B2 | 2/2007 | Machalek ..................... | 715/522 |
| 7,447,704 B2 | 11/2008 | Han et al. ..................... | 707/104.1 |
| 2005/0060300 A1* | 3/2005 | Stolte et al. ........................ | 707/3 |
| 2007/0061611 A1* | 3/2007 | Mackinlay et al. .............. | 714/5 |
| 2007/0133522 A1* | 6/2007 | Morgan ......................... | 370/352 |
| 2009/0187815 A1* | 7/2009 | Becerra et al. ................ | 715/212 |
| 2009/0282324 A1 | 11/2009 | Patel ............................. | 715/212 |
| 2009/0327851 A1 | 12/2009 | Raposo ......................... | 715/213 |

OTHER PUBLICATIONS

Brian Burgess, "How to Create a Pivot Table in Excel 2007", http://www.howtogeek.com/howto/6416/how-to-create-a-pivot-table-in-excel-2007/, published Nov. 12, 2009, pp. 6.*
*Chart Advisor*, Last updated: May 26, 2010, © 2010 Microsoft Corporation, http://www.officelabs.com/projects/chartadvisor/Pages/default.aspx. pp. 1.
Flex/Flash Pivot Table and Charts v1.3—Retrieved Date: Aug. 9, 2010, pp. 1 http://www.flexmonster.com/flash/help/index.html.
EZ-Pivot for Excel 7.1—Retrieved Date: Aug. 9, 2010, pp. 1-3 http://wareseeker.com/Business-Finance/ez-pivot-for-excel-7.1.zip/3512262.
Michael Delaney et al.: "How to Create Pivot Tables in Excel"—Retrieved Dated: Aug. 9, 2010, pp. 1-5, http:www.wikihow.com/Create-Pivot-Tables-E.

* cited by examiner

*Primary Examiner* — Chau Nguyen
(74) *Attorney, Agent, or Firm* — Jessica Meyers; Jim Ross; Micky Minhas (57) ABSTRACT

Cross-tabular reports may be automatically created by a computer from received source data. After receiving the source data, the computer may determine different information types associated with fields contained in the source data. The computer may then score each field based on the information types. A score describes a suitable placement of each field as a cross-tabular report row, a cross-tabular report column or a cross-tabular report value field. The computer may then select the fields having the highest score for placement as cross-tabular report rows, cross-tabular report columns or cross-tabular report value fields in a cross-tabular report. Finally, the computer may build the cross-tabular report with the selected fields.

20 Claims, 7 Drawing Sheets

FIGURE 1

| # Of Uniques | Row | Column | Value |
|---|---|---|---|
| 1 - 2 | 5 | 5 | -10 |
| 3 - 8 | 40 | 60 | 0 |
| 9 - 20 | 60 | 30 | 20 |
| 21 - 499 | 10 | 10 | 60 |
| 500+ | -50 | -50 | 30 |
| | | | |
| Underlying Data Type | Row | Column | Value |
| General | 0 | 0 | 0 |
| Number | -10 | -10 | 20 |
| Currency | -10 | -10 | 20 |
| Accounting | -10 | -10 | 20 |
| Date | 20 | 10 | -10 |
| Time | 20 | 10 | -10 |
| Percentage | 0 | 0 | 10 |
| Fraction | -50 | -50 | -50 |
| Scientific | -50 | -50 | -50 |
| Text | 10 | 10 | 0 |
| Special | -50 | -50 | -50 |
| Custom | 20 | 10 | -10 |
| | | | |
| Field Header | Row | Column | Value |
| Revenue/Profit/Total/Subt | -10 | -10 | 10 |
| Region/Location | 10 | 10 | -10 |
| Date/Month/Day/Week | 10 | 10 | -10 |
| City/State | 10 | 10 | -10 |
| Name | 10 | 10 | -10 |

*SCORING TABLE*

CREATING CROSS-TABULAR REPORTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Spreadsheet application programs may be utilized to create cross-tabular reports for summarizing data from a data source. For example, a data table in a spreadsheet may contain multiple individual records associated with product sales, such as the geographical region (e.g., North, South, East and West) a product was sold, the style of the product, the shipping date of the product, the number of product units sold, the price at which the product was sold, and the cost associated with manufacturing the product. A user wishing to summarize the number of product units sold in each of four the geographical regions by shipping date may utilize an application program to create a cross-tabular report which highlights the aforementioned information in a multidimensional chart.

Drawbacks with using current application programs to create cross-tabular reports however, is that the user experience requires two learning curves—one to understand what the cross-tabular feature of the application program does, and the other to learn how to manipulate and use the cross-tabular report feature. As a result, the user experience in utilizing current application programs to create cross-tabular reports is poor, especially for novice or casual users. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for automatically creating cross-tabular reports from received source data. After receiving the source data, a computer may determine different information types associated with fields contained in the source data. The computer may then score each field based on the information types. A score describes a suitable placement of each field as a cross-tabular report row, a cross-tabular report column or a cross-tabular report value field. The computer may then select the fields having the highest score for placement as cross-tabular report rows, cross-tabular report columns or cross-tabular report value fields in a cross-tabular report. Finally, the computer may build the cross-tabular report with the selected fields.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for automatically creating cross-tabular reports from received source data. After receiving the source data, a computer may determine different information types associated with fields contained in the source data. The computer may then score each field based on the information types. A score describes a suitable placement of each field as a cross-tabular report row, a cross-tabular report column or a cross-tabular report value field. The computer may then select the fields having the highest score for placement as cross-tabular report rows, cross-tabular report columns or cross-tabular report value fields in a cross-tabular report. Finally, the computer may build the cross-tabular report with the selected fields.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
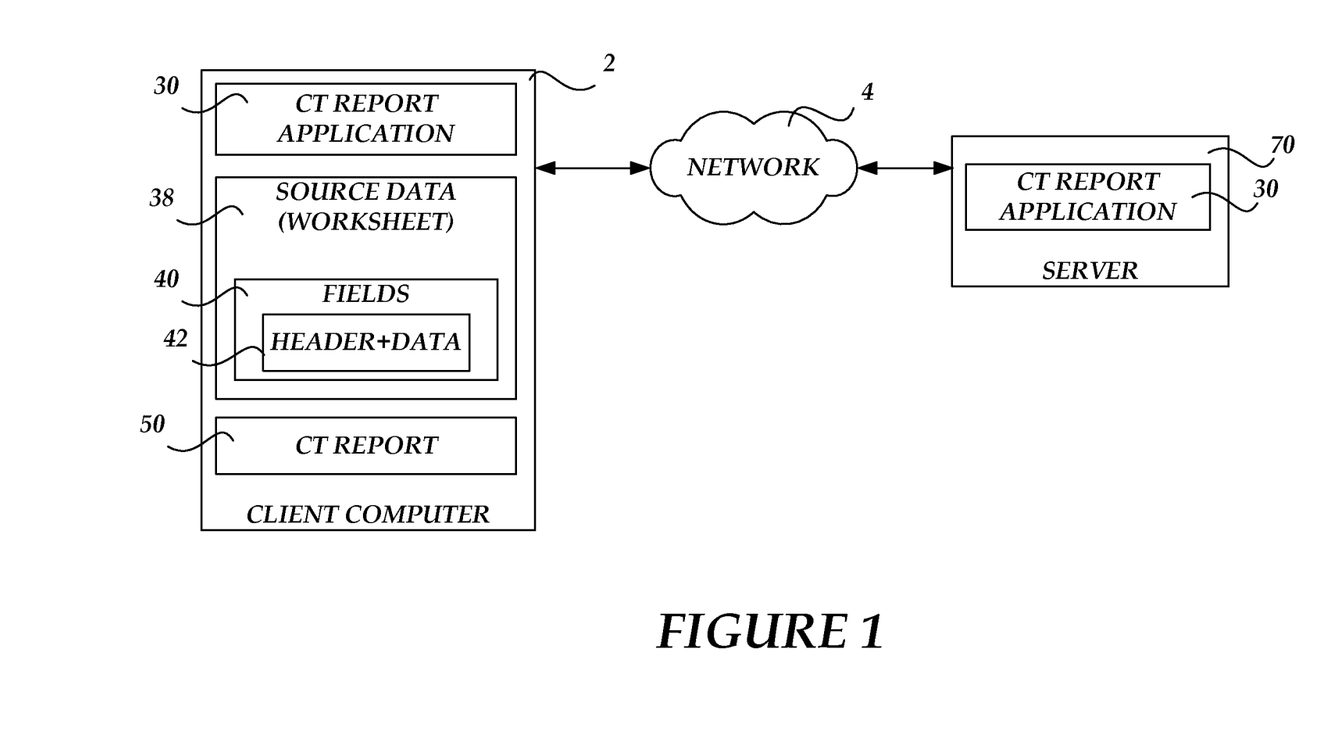
FIG. 1 is a block diagram illustrating a network architecture for automatically creating cross-tabular reports from received source data, in accordance with various embodiments.

Referring now to the drawings, in which like numerals represent like elements through the several figures, various aspects of the present invention will be described. FIG. 1 is a block diagram illustrating a network architecture for automatically creating cross-tabular reports from received source data, in accordance with various embodiments. The network architecture includes a client computer 2 in communication with a server 70 over a network 4. The client computer 2 may include a cross-tabular ("CT") report application 30, source data 38 and a CT report 50.

As will be described in greater detail below with respect to FIGS. 2-7, the CT report application 30, in accordance with an embodiment, may comprise a computer software application capable of automatically generating one or more CT reports 50 from the source data 38. In accordance with an embodiment, the CT report application 30 may comprise the EXCEL spreadsheet application program from MICROSOFT CORPORATION of Redmond, Wash. It should be appreciated, however, that other application programs from other manufacturers, which are capable of generating cross-tabular reports, may also be utilized in accordance with the various embodiments described herein.

In accordance with an embodiment, the source data 38 may comprise a spreadsheet application worksheet containing multiple fields (i.e., data fields) 40. Each of the fields 40 may further comprise header+data 42. In particular, in accordance with an embodiment, each of the fields 40 may include two or more rows and two or more columns of data as well as one or more columns including a header, from a spreadsheet application worksheet. For example, a field 40 may include a portion of monthly sales data comprising two columns and two rows. The first or top row may contain two column headers for the first two months of a year (e.g., January and February) and the second or bottom row may contain sales data for each month.

The CT report 50 may comprise, in accordance with an embodiment, a pivot table. As is known to those skilled in the art, pivot tables may be utilized for displaying summarized (e.g., sorted, counted and totaled) data stored in a table or spreadsheet. Pivot tables are also useful for quickly creating unweighted cross tabulations.

The client computer 2 may communicate with the server 70 over the network 4 which may include a local network or a wide area network (e.g., the Internet). In accordance with an embodiment, the server 70 may optionally or additionally store the CT report application 30 for supporting server-based creation of cross-tabular reports.

Figure 2:
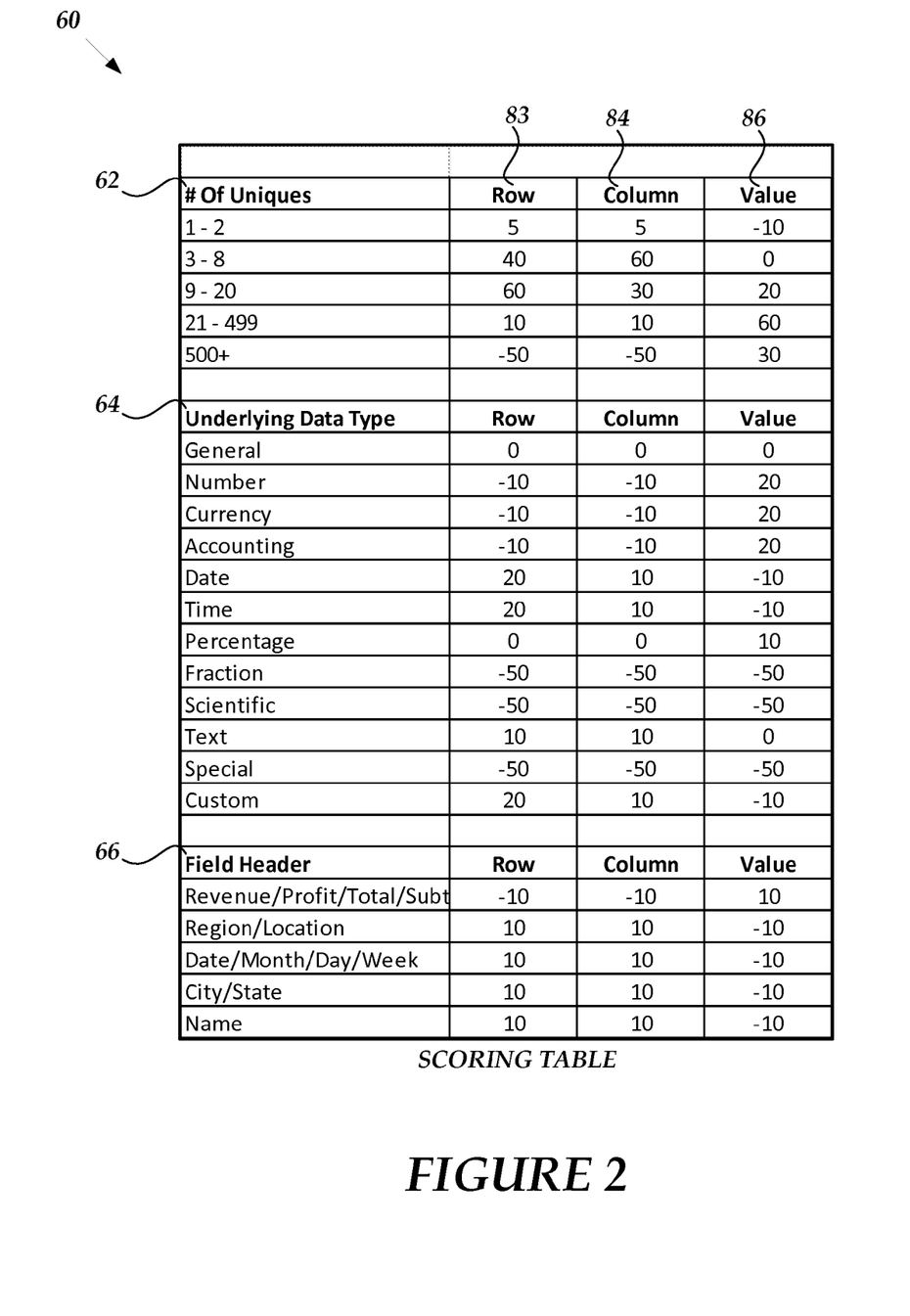
FIG. 2 is a block diagram illustrating a scoring table which may be utilized in automatically creating cross-tabular reports from received source data, in accordance with various embodiments.

FIG. 2 is a block diagram illustrating a scoring table 60 which may be utilized in automatically creating cross-tabular reports from received source data, in accordance with various embodiments. In accordance with an embodiment, the scoring table 60 may be incorporated into the CT report application 30. The scoring table 60 may be organized by multiple information types which are used to describe the fields 40 in the source data 38. For example, the scoring table 60 shows three different information types including #Of Uniques 62, Underlying Data Type 64 and Field Header 66. The #Of Uniques 62, as discussed herein, may represent the number of unique values in a column of data. For example, a column of data containing a repeating list of the months of a year (i.e., January through December, repeated multiple times) would have twelve unique data values from among all of the values in the repeating list. Thus, the #Of Uniques in this example would be the number twelve. The Underlying Data Type 64 may represent one or more data types, such as those used in spreadsheet application worksheet cells, for identifying data contained therein. In accordance with an embodiment, illustrative data types may include, but are not limited to, the following: "General," "Number," "Currency," "Accounting," "Date," "Time," "Percentage," "Fraction," "Scientific," "Text," "Special" and "Custom." In accordance with various embodiments, "Special" may include data types for handling data having a pre-defined format such as zip codes, telephone numbers and Social Security numbers. Similarly, "Custom" may include formatted data types as defined by a user. The Field Header 66 may represent categories of field header types used to identify data. In accordance with an embodiment, illustrative field header types may include, but are not limited to, the following: "Revenue/Profit/Total/Subtotal," "Region/Location," "Date/Month/Day/Week," "City/State" and "Name."

The scoring table 60 may also include pre-assigned scoring values indicative of the suitability of a field 40 for placement (in a cross-tabular report) as a cross-tabular report Row 83, a cross-tabular report Column 84, or cross-tabular report Value 86. In particular, scoring values having numerical values greater than zero are more suitable for placement than scoring values having numerical values less than zero (i.e., negative values). In accordance with an embodiment, the CT report application 30 may be configured, for each field in an incoming data stream, to look for the number of uniques in the field, the underlying data type of the field, and the header used for the field, and to further utilize the scoring table 60, determine the pre-assigned scoring values for each. For example, the CT report application 30 may determine that a field has between five unique values, an underlying data type corresponding to Date and a Revenue field header. Based on the scoring table 60, the CT report application 30 would assign scoring values of 60, 30 and 20 for Row Column and Value, respectively, based on the number unique values in the field, scoring values of 20, 10 and 10 for Row, Column and Value, respectively, based on the underlying data type for the field, and scoring values of −10, −10 and 10 for Row, Column and Value, respectively, based on field header for the field. As will be described in greater below with respect to FIGS. 4-7, the CT report application 30 may be configured, after determining the Row, Column and Value scores for each of the plurality of fields 40, to pick "winning" fields (adjudicating any ties, as needed), and then build a cross-tabular report (e.g., a pivot table) with the winning fields.

Exemplary Operating Environment

Figure 3:
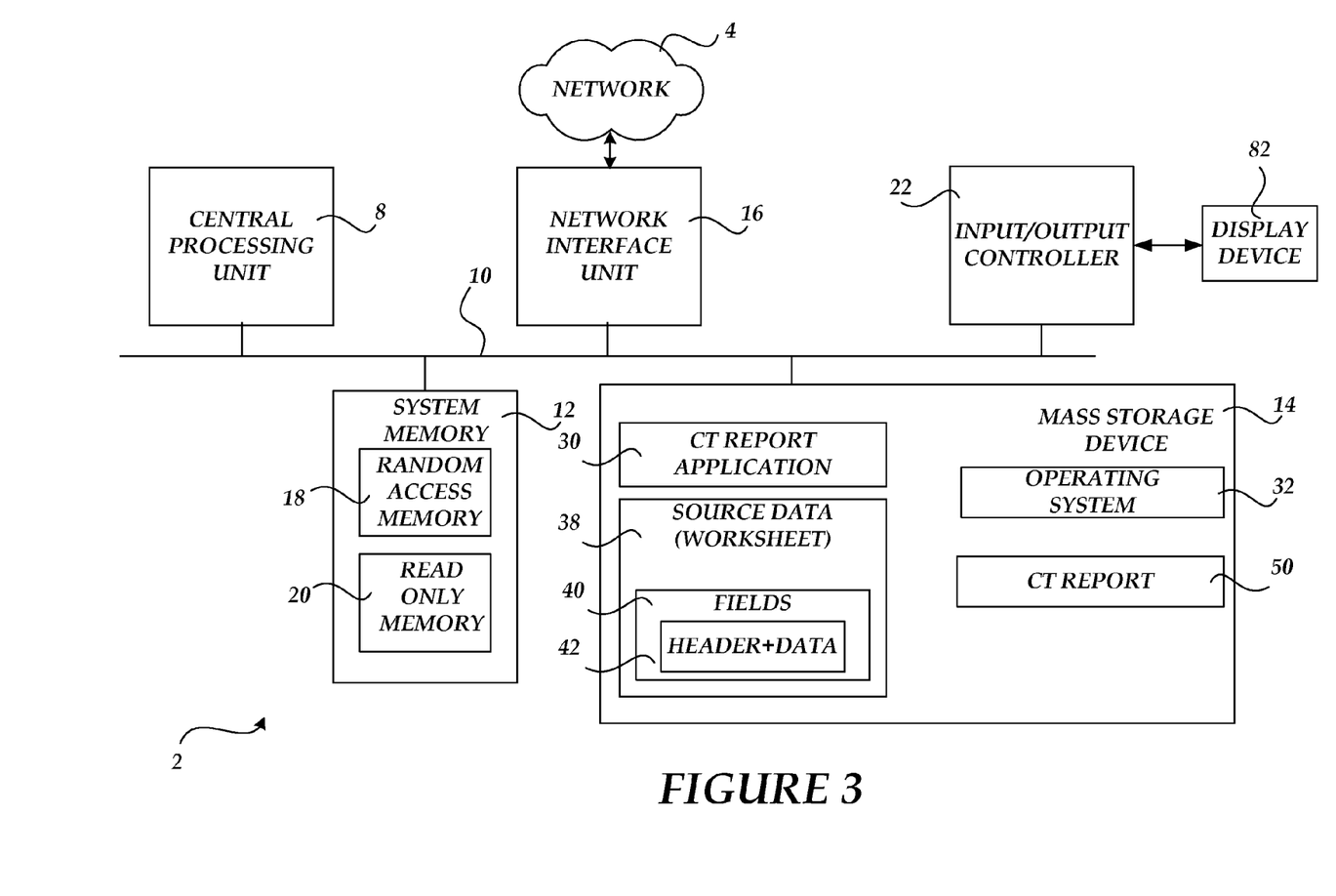
FIG. 3 is a block diagram illustrating a client computing environment which may be utilized in automatically creating cross-tabular reports from received source data, in accordance with various embodiments.

Referring now to FIG. 3, the following discussion is intended to provide a brief, general description of a suitable computing environment in which various illustrative embodiments may be implemented. While various embodiments will be described in the general context of program modules that execute in conjunction with program modules that run on an operating system on a computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 3 shows the client computer 2 which may include a general purpose desktop, laptop, handheld, tablet, or other type of computer capable of executing one or more application programs. The client computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The client computer 2 further includes a mass storage device 14 for storing an operating system 32, the CT report application 30, the source data 38 (including the fields 40 and the header+data 42), and the CT report 50. In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the client computer 2. The term computer-readable media as used herein may include computer storage media. Computer storage media may include volatile and nonvolatile, removable and non-removable media implemented in any method or technology for storage of information, such as computer readable instructions, data structures, program modules, or other data. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the client computer 2. Any such computer storage media may be part of the client computer 2.

The term computer-readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments, the client computer 2 may operate in a networked environment using logical connections to remote computers through the network 4 which may comprise, for example, a local network or a wide area network (e.g., the Internet). The client computer 2 may connect to the network 4 through a network interface unit 16 connected to the bus 10. It should be appreciated that the network interface unit 16 may also be utilized to connect to other types of networks and remote computing systems. The client computer 2 may also include an input/output controller 22 for receiving and processing input from a number of input types, including a keyboard, mouse, pen, stylus, finger, and/or other means. Similarly, an input/output controller 22 may provide output to a display device 82, a printer, or other type of output device. Additionally, a touch screen can serve as an input and an output mechanism. It should be appreciated that the server 70, shown in FIG. 1, may include many of the conventional components shown and discussed above with respect to the client computer 2.

Figure 4:
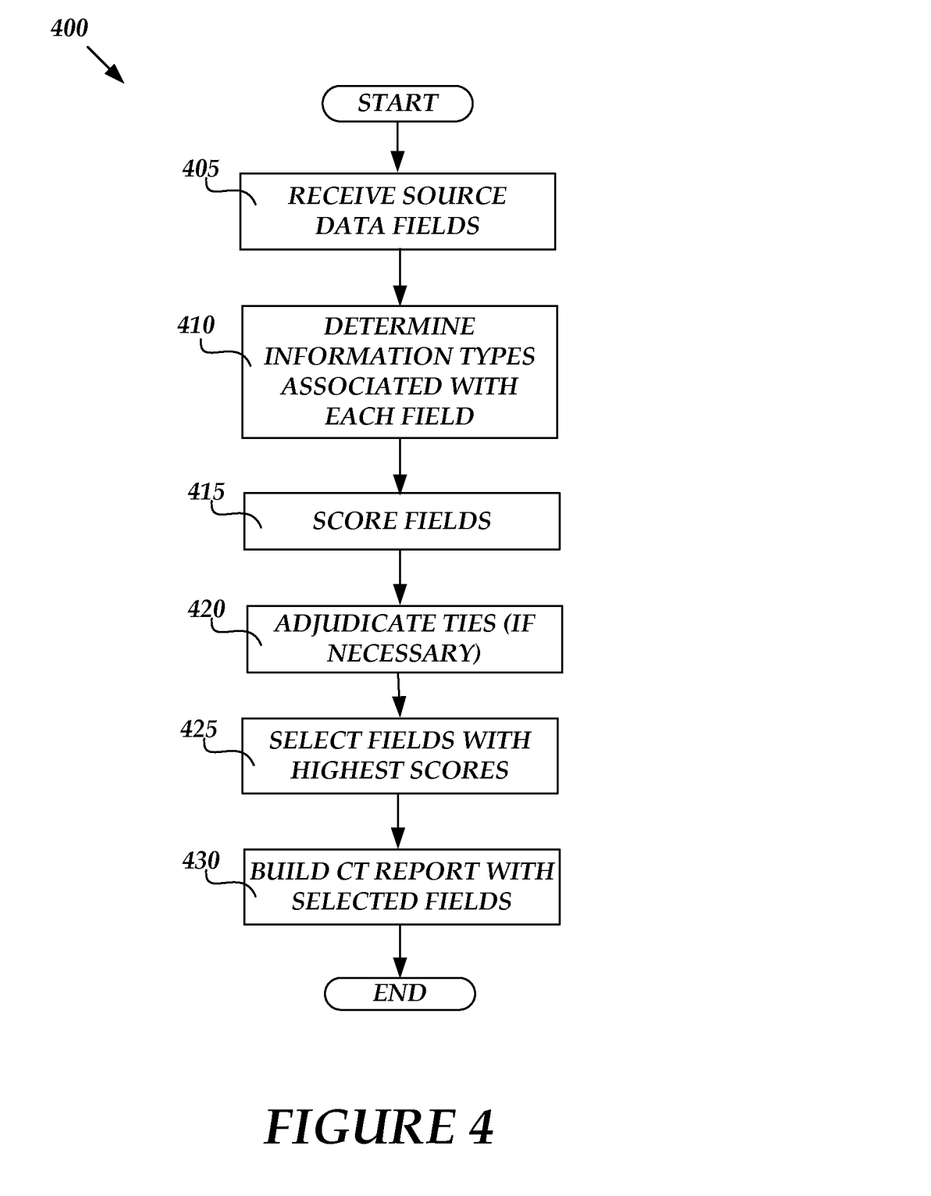
FIG. 4 is a flow diagram illustrating a routine for automatically creating cross-tabular reports from received source data, in accordance with various embodiments.

FIG. 4 is a flow diagram illustrating a routine 400 for automatically creating cross-tabular reports from received source data, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 4-7 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405 where the CT report application 30, executing on the client computer 2, receives the fields 40 in the source data 38. In particular, each field received by the CT report application 30 may include source data comprising two or more rows and two or more columns in a spreadsheet application worksheet. Furthermore, at least one of the columns in each filed may include a header. It should be appreciated, that in accordance with an embodiment, the received source data for each field may be automatically selected by the CT report application 30 by following a path to find an outer data boundary of a currently selected cell or cells in a cell table (e.g., a spreadsheet).

From operation 405, the routine 400 continues to operation 410 where the CT report application 30, executing on the client computer 2, determines the information types (i.e., the #Of Uniques 62, the underlying data type 64 and the field header 66) associated with each of the received fields 40.

From operation 410, the routine 400 continues to operation 415 where the CT report application 30, executing on the client computer 2, scores each of the fields 40 based on the three information types: #Of Uniques 62, the underlying data type 64 and the field header 66, determined at operation 410. As discussed above with respect to FIG. 2, scores may be determined by using the scoring table 60 to assign pre-assigned scoring values which describe a suitable placement of each of the fields 40 as a cross-tabular report row, a cross-tabular report column and a cross-tabular report value field, for each of the aforementioned information types, in a cross-tabular report. For example, utilizing the scoring table 60, the CT report application 30 may determined that the #Of Uniques 62 for a field 40 is 15, the underlying data type is "Text" and the field header 66 is "Name" (e.g., the name of a month of the year). Referring now to the scoring table 60, the Row score for a #Of Uniques between 9 and 20 is 60, the Column score is 30 and the Value score is 20. Furthermore, the Row score for a "Text" underlying data type is 10, the Column score is 10, and the Value score is 0. Still further, the Row score for a "Name" field header is 10, the Column score is 10 and the Value score is −10. Totaling the scores for Row, Column and Value for the aforementioned field yields an overall Row score of 80, an overall Column score of 50 and an overall Value score of 10.

From operation 415, the routine 400 continues to operation 420 where the CT report application 30, executing on the client computer 2, may perform the optional operation of adjudicating ties between the scores determined for each of the fields 40. In accordance with various embodiments, the CT report application 30 may be configured to utilize a number of approaches to adjudicate tie scores. Illustrative approaches for the adjudication of tie scores will be discussed in greater detail below with respect to FIGS. 5-7.

From operation 420, the routine 400 continues to operation 425 where the CT report application 30, executing on the client computer 2, may select the highest scoring or "winning" fields, from among the fields 40, for placement as cross-tabular report rows, columns and value fields in a cross-tabular report. In particular, the CT report application 30 may be configured to compare the overall row, column and value scores determined for each of the fields 40 and pick the winners. For example, if a first field in the fields 40 has an overall row score of 80 a second field has an overall row score of 70, and a third field has an overall row score of 20, then the first field would be determined to be the winning row field and its data would be inserted as a row in a cross-tabular report. Similarly, if the first field in the fields 40 has an overall column score of 40, the second field has an overall column score of 50, and the third field has an overall column score of 10, then the second field would be determined to be the winning column field and its data would be inserted as a column in the cross tabular report. Similarly, if the first field in the fields 40 has an overall value score of 0, the second field has an overall value score of −10, and the third field has an overall value score of 20, then the third field would be determined to be the winning value field and its data would be inserted as a value field in the cross tabular report.

From operation 425, the routine 400 continues to operation 430 where the CT report application 30, executing on the client computer 2, may build a cross-tabular report (e.g., the CT report 50) with the winning fields selected at operation 425. In particular, the CT report application 30 may be configured, for each winning field, to automatically enter that field's data as a cross-tabular report row, columns or value field (as appropriate), to create the cross-tabular report. It should be understood that in some instances (e.g., improper data formatting or insufficient data), the CT report application 30 may be unable to build a cross-tabular report from one or more received input fields. In these instances, the CT report application 30 may be configured to generate an error message and provide a user with the opportunity to manually build a cross-tabular report from the fields. From operation 430, the routine 400 then ends.

Figure 5:
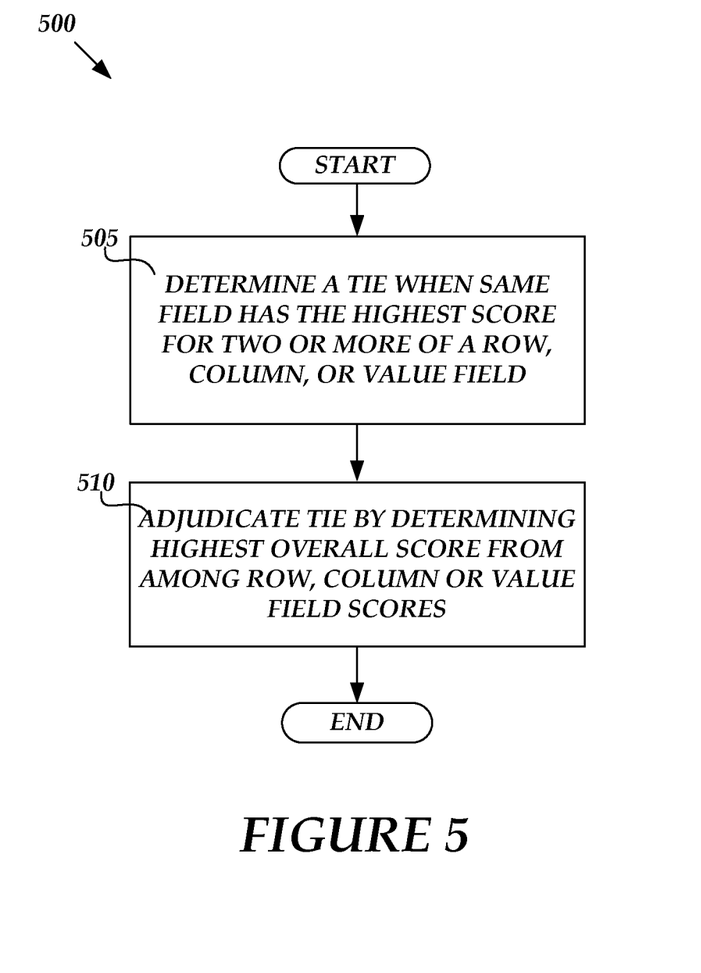
FIG. 5 is a flow diagram illustrating a routine for adjudicating ties determined during the scoring of fields to determine placement in an automatically created cross-tabular report, in accordance with an embodiment.

FIG. 5 is a flow diagram illustrating a routine 500 for adjudicating ties determined during the scoring of fields to determine placement in an automatically created cross-tabular report, in accordance with an embodiment. The routine 500 begins at operation 505 where the CT report application 30, executing on the client computer 2, determines a tie when a same field 40 has the highest score for suitability as two or more of a cross-tabular report row, column or value field. For example, during scoring of the fields 40 at operation 415, the CT report application 30 may determine that the same field has both the highest overall row and the highest overall column score among all of the received fields 40.

From operation 505, the routine 500 continues to operation 510 where the CT report application 30, executing on the client computer 2, adjudicates the tie by determining the highest overall score between the two cross-tabular report categories. For example, if the row score for the field in question is 80 and the column score for the field is 70, the field would be determined as the winner for placement as a row in the cross-tabular report even though it would also be suitable for placement as a column, based on its score. It should be appreciated that in this instance, the field having the second highest overall score for column may then be selected for placement as a column in the cross-tabular report. From operation 510, the routine 500 then ends.

Figure 6:
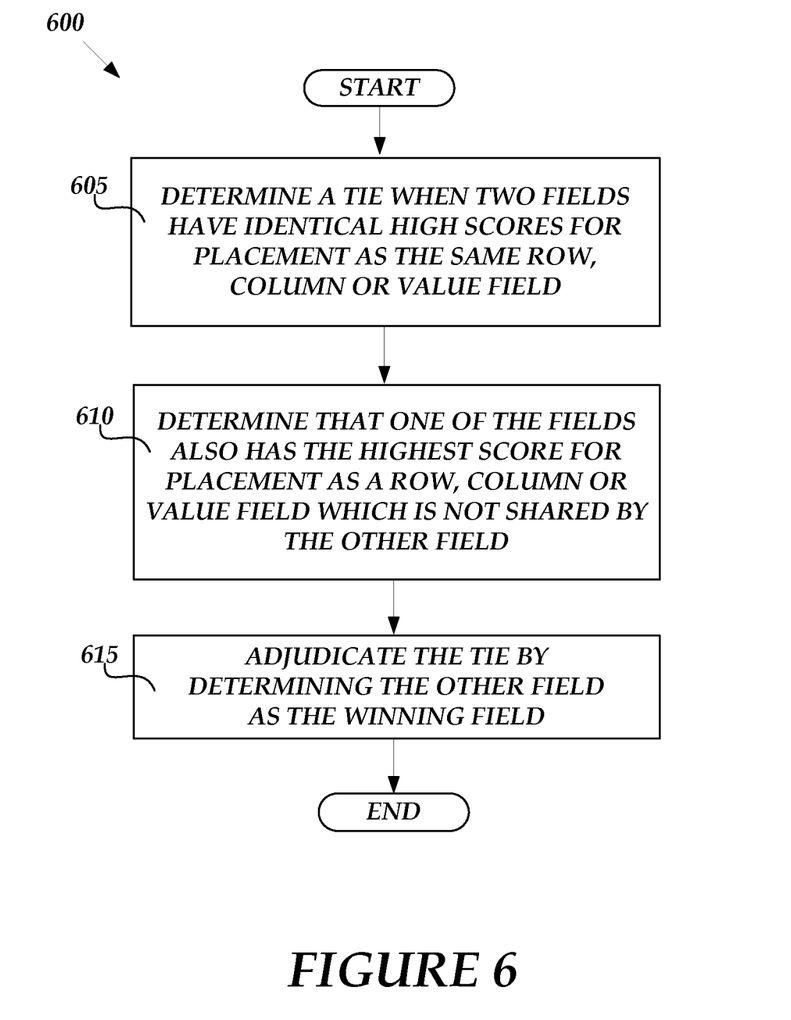
FIG. 6 is a flow diagram illustrating a routine for adjudicating ties determined during the scoring of fields to determine placement in an automatically created cross-tabular report, in accordance with an embodiment.

FIG. 6 is a flow diagram illustrating a routine 600 for adjudicating ties determined during the scoring of fields to determine placement in an automatically created cross-tabular report, in accordance with an embodiment. The routine 600 begins at operation 605 where the CT report application 30, executing on the client computer 2, determines a tie when two of the fields 40 have identical highest scores for placement as a row, column or value field in a cross-tabular report. For example, during scoring of the fields 40 at operation 415, the CT report application 30 may determine that a first field and a second field both have overall row scores of 70 and 70 is the highest row score among all of the received fields.

From operation 605, the routine 600 continues to operation 610 where the CT report application 30, executing on the client computer 2, determines whether either of the two tied fields, identified at operation 605, also scored the highest score for placement as another cross-tabular report category. For example, with respect to the previous example discussed at operation 605, the CT report application 30 may also determine that the first field has the highest overall column score among all of the received fields and that the second field does not.

From operation 610, the routine 600 continues to operation 615 where the CT report application 30, executing on the client computer 2, adjudicates the tie by determining the winning field as the field which does not have the highest overall score for two or more cross-tabular report categories. For example, with respect to the previous example discussed at operation 610, the CT report application 30 may determine that the second field is the winning field for a cross-tabular report row since the first field could be selected as a cross-tabular report column. From operation 615, the routine 600 then ends.

Figure 7:
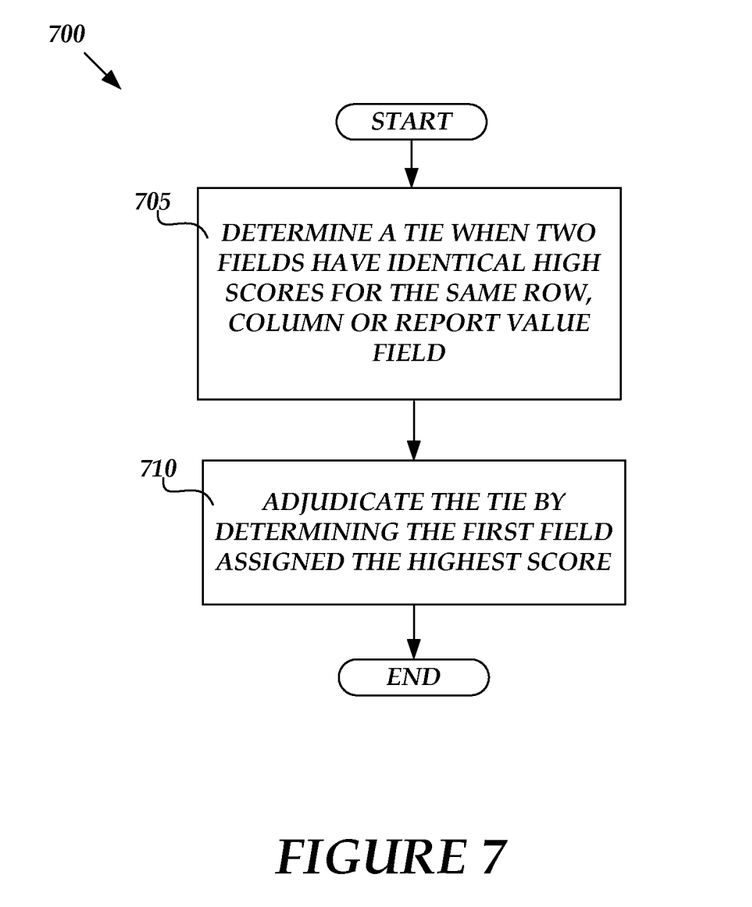
FIG. 7 is a flow diagram illustrating a routine for adjudicating ties determined during the scoring of fields to determine placement in an automatically created cross-tabular report, in accordance with an embodiment.

FIG. 7 is a flow diagram illustrating a routine 700 for adjudicating ties determined during the scoring of fields to determine placement in an automatically created cross-tabular report, in accordance with an embodiment. The routine 700 begins at operation 705 where the CT report application 30, executing on the client computer 2, determines a tie two fields have identical high scores for the same cross-tabular report category (and where none of the situations discussed above in routines 500 and 600 apply). Thus, for during scoring of the fields 40 at operation 415, the CT report application 30 may determine that a first field and a second field both have overall row scores of 70, that 70 is the highest row score among all of the received fields, and that neither field has the highest overall score for any other cross-tabular report categories.

From operation 710, the routine 700 continues to operation 700 where the CT report application 30, executing on the client computer 2, adjudicates the tie by determining the first field assigned the highest score during the scoring of the fields 40, as the winner. For example, with respect to the previous example discussed at operation 705, if the first field was scored before the second field, then the first field is declared the winner for placement as a row in the cross-tabular report. In accordance with an embodiment, the field that is scored first may be identified as the leftmost field in a spreadsheet application worksheet. From operation 710, the routine 700 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of creating cross-tabular reports, comprising:
   receiving, by the computer, source data comprising a plurality of fields;
   determining, by the computer, a plurality of different information types associated with each of the plurality of fields;
   scoring, by the computer, each of the plurality of fields based on the plurality of different information types, for a suitable placement of each of the plurality of fields as at least one of a cross-tabular report row, a cross-tabular report column and a cross-tabular report value field in a cross-tabular report;
   selecting, by the computer, from among the plurality of fields, one or more fields having the highest score for placement as the at least one of the cross-tabular report row, the cross-tabular report column and the cross-tabular report value field in the cross-tabular report; and
   building, by the computer, the cross-tabular report with the selected one or more fields having the highest score.

2. The method of claim 1, further comprising adjudicating ties between the scores for each of the plurality of fields.

3. The method of claim 2, wherein adjudicating ties between the scores for each of the plurality of fields comprises:
   determining a tie when a field in the plurality of fields has the highest score for placement as at least one of the cross-tabular report row, the cross-tabular report column and the cross-tabular report value field and the field in the plurality of fields has the highest score for placement as at least another one of the cross-tabular report row, the cross-tabular report column and the cross-tabular report value field; and
   adjudicating the tie upon determining that the highest score for the field is the higher of the scores for the field from among the at least one of the cross-tabular report row, the cross-tabular report column and the cross-tabular report value field and the at least another one of the cross-tabular report row, the cross-tabular report column and the cross-tabular report value field.

4. The method of claim 2, wherein adjudicating ties between the scores for each of the plurality of fields comprises:
   determining a tie when a score value representing the highest score is identical for a field in the plurality of fields and at least another field in the plurality of fields for placement as a same one of the at least one of the cross-tabular report row, the cross-tabular report column and the cross-tabular report value field;
   determining that only one field in a group comprising the field and the at least another field has the highest score for placement as another one of the at least one of the cross-tabular report row, the cross-tabular report column and the cross-tabular report value field; and
   adjudicating the tie by determining that the field, in the group comprising the field and the at least another field, not having the highest score for another one of the at least one of the cross-tabular report row, the cross-tabular report column and the cross-tabular report value field as having the highest score for the same one of the at least one of the cross-tabular report row, the cross-tabular report column and the cross-tabular report value field.

5. The method of claim 2, wherein adjudicating ties between the scores for each of the plurality of fields comprises:
   determining a tie when a score value representing the highest score is identical for a field in the plurality of fields and at least another field in the plurality of fields for a same one of the at least one of the cross-tabular report row, the cross-tabular report column and the cross-tabular report value field; and
   adjudicating the tie by:
      determining an order of the scores from among the field and the at least another field; and
      determining the field from among the field and the at least another field which is first in the order of the scores.

6. The method of claim 1, wherein receiving, by the computer, the source data comprising a plurality of fields comprises receiving at least two rows and at least two columns, representing each of the plurality of fields, from a spreadsheet application worksheet, wherein at least one of the at least two columns comprises a header.

7. The method of claim 1, wherein determining, by the computer, a
   plurality of different information types associated with each of the plurality of fields comprises:
   determining a number of unique values in each of the plurality of fields;
   determining an underlying data type of each of the plurality of fields; and
   determining a header used for each of the plurality of fields.

8. The method of claim 1, wherein building, by the computer, a cross-tabular report with the selected one or more fields having the highest score comprises automatically entering the selected one or more fields into one or more of the cross-tabular report row, the cross-tabular report column and the cross-tabular report value field to create the cross-tabular report.

9. A computer system for creating cross-tabular reports, comprising:
   a system memory for storing executable program code; and
   a central processing unit, functionally coupled to the system memory, the central processing unit being responsive to computer-executable instructions contained in the program code and operative to:
      receive source data comprising a plurality of fields;
      determine a plurality of different information types associated with each of the plurality of fields;
      score each of the plurality of fields, based on the plurality of different information types, for a suitable placement of each of the plurality of fields as at least one of a cross-tabular report row, a cross-tabular report column and a cross-tabular report value field in a cross-tabular report;
      select, from among the plurality of fields, one or more fields having the highest score for placement as the at least one of the cross-tabular report row, the cross-tabular report column and the cross-tabular report value field in the cross-tabular report; and
      build the cross-tabular report with the selected one or more fields having the highest score.

10. The system of claim 9, wherein the central processing unit is further operative to adjudicate ties between the scores for each of the plurality of fields.

11. The system of claim 10, wherein the central processing unit, in adjudicating ties between the scores for each of the plurality of fields, is operative to:
   determine a tie when a field in the plurality of fields has the highest score for placement as at least one of the cross-tabular report row, the cross-tabular report column and the cross-tabular report value field and the field in the plurality of fields has the highest score for placement as at least another one of the cross-tabular report row, the cross-tabular report column and the cross-tabular report value field; and adjudicate the tie upon determining that the highest score for the field is the higher of the scores for the field from among the at least one of the cross-tabular report row, the cross-tabular report column and the cross-tabular report value field and the at least another one of the cross-tabular report row, the cross-tabular report column and the cross-tabular report value field.

12. The system of claim 10, wherein the central processing unit, in adjudicating ties between the scores for each of the plurality of fields, is operative to:

determine a tie when a score value representing the highest score is identical for a field in the plurality of fields and at least another field in the plurality of fields for placement as a same one of the at least one of the cross-tabular report row, the cross-tabular report column and the cross-tabular report value field;

determine that only one field in a group comprising the field and the at least another field has the highest score for placement as another one of the at least one of the cross-tabular report row, the cross-tabular report column and the cross-tabular report value field; and adjudicate the tie by determining that the field, in the group comprising the field and the at least another field, not having the highest score for another one of the at least one of the cross-tabular report row, the cross-tabular report column and the cross-tabular report value field as having the highest score for the same one of the at least one of the cross-tabular report row, the cross-tabular report column and the cross-tabular report value field.

13. The system of claim 10, wherein the central processing unit, in adjudicating ties between the scores for each of the plurality of fields, is operative to:

determine a tie when a score value representing the highest score is identical for a field in the plurality of fields and at least another field in the plurality of fields for a same one of the at least one of the cross-tabular report row, the cross-tabular report column and the cross-tabular report value field; and adjudicate the tie by:
determining an order of the scores from among the field and the at least another field; and
determining the field from among the field and the at least another field which is first in the order of the scores.

14. The system of claim 9, wherein the central processing unit, in receiving source data comprising a plurality of fields, is operative to receive at least two rows and at least two columns, representing each of the plurality of fields, from a spreadsheet application worksheet, wherein at least one of the at least two columns comprises a header.

15. The system of claim 9, wherein the central processing unit, in determining a plurality of different information types associated with each of the plurality of fields, is operative to:

determine a number of unique values in each of the plurality of fields;
determine an underlying data type of each of the plurality of fields; and
determine a header used for each of the plurality of fields.

16. The system of claim 9, wherein the central processing unit, in building a cross-tabular report with the selected one or more fields having the highest score, is operative to automatically enter the selected one or more fields into one or more of the cross-tabular report row, the cross-tabular report column and the cross-tabular report value field to create the cross-tabular report.

17. A computer storage medium comprising computer executable instructions which, when executed on a computer, will cause the computer to perform a method of creating cross-tabular reports, the computer storage medium further comprising a system memory which is coupled to at least one central processing unit in the computer, the method comprising:

receiving source data comprising a plurality of fields, each of the plurality of fields comprising at least two rows and at least two columns from a spreadsheet application worksheet, wherein at least one of the at least two columns comprises a header,
determining a number of unique values in each of the plurality of fields;
determining an underlying data type of each of the plurality of fields;
determining a header used for each of the plurality of fields;
scoring each of the plurality of fields, based on the determined number of unique values, the underlying data type, and the header, for a suitable placement of each of the plurality of fields as at least one of a cross-tabular report row, a cross-tabular report column and a cross-tabular report value field in a cross-tabular report;
adjudicating ties between the scores for each of the plurality of fields;
selecting, by the computer, from among the plurality of fields, one or more fields having the highest score for placement as the at least one of the cross-tabular report row, the cross-tabular report column and the cross-tabular report value field in the cross-tabular report; and
automatically entering the selected one or more fields into one or more of the cross-tabular report row, the cross-tabular report column and the cross-tabular report value field to create the cross-tabular report.

18. The computer storage medium of claim 17, wherein adjudicating ties between the scores for each of the plurality of fields comprises:

determining a tie when a field in the plurality of fields has the highest score for placement as at least one of the cross-tabular report row, the cross-tabular report column and the cross-tabular report value field and the field in the plurality of fields has the highest score for placement as at least another one of the cross-tabular report row, the cross-tabular report column and the cross-tabular report value field; and
adjudicating the tie upon determining that the highest score for the field is the higher of the scores for the field from among the at least one of the cross-tabular report row, the cross-tabular report column and the cross-tabular report value field and the at least another one of the cross-tabular report row, the cross-tabular report column and the cross-tabular report value field.

19. The computer storage medium of claim 18, wherein adjudicating ties between the scores for each of the plurality of fields comprises:

determining a tie when a score value representing the highest score is identical for a field in the plurality of fields and at least another field in the plurality of fields for placement as a same one of the at least one of the cross-tabular report row, the cross-tabular report column and the cross-tabular report value field;
determining that only one field in a group comprising the field and the at least another field has the highest score for placement as another one of the at least one of the cross-tabular report row, the cross-tabular report column and the cross-tabular report value field; and adjudicating the tie by determining that the field, in the group comprising the field and the at least another field, not having the highest score for another one of the at least one of the cross-tabular report row, the cross-tabular report column and the cross-tabular report value field as having the highest score for the same one of the at least one of the cross-tabular report row, the cross-tabular report column and the cross-tabular report value field.

20. The computer storage medium of claim 18, wherein adjudicating ties between the scores for each of the plurality of fields comprises:

determining a tie when a score value representing the highest score is identical for a field in the plurality of fields and at least another field in the plurality of fields for a same one of the at least one of the cross-tabular report row, the cross-tabular report column and the cross-tabular report value field; and adjudicating the tie by:

determining an order of the scores from among the field and the at least another field; and determining the field from among the field and the at least another field which is first in the order of the scores.

* * * * *